(12) United States Patent
Edström et al.

(10) Patent No.: US 10,941,952 B2
(45) Date of Patent: Mar. 9, 2021

(54) AIR TREATMENT SYSTEM FOR MANAGING THE CONDITION OF AIR IN AN ENCLOSED ENVIRONMENT

(71) Applicant: Sally R AB, Västerås (SE)

(72) Inventors: Fredrik Edström, Uppsala (SE); Anders Edström, Hallstahammar (SE)

(73) Assignee: Sally R AB

( * ) Notice: Subject to any disclaimer, the term of this patent is extended or adjusted under 35 U.S.C. 154(b) by 182 days.

(21) Appl. No.: 16/300,331

(22) PCT Filed: May 10, 2017

(86) PCT No.: PCT/EP2017/061161
§ 371 (c)(1),
(2) Date: Nov. 9, 2018

(87) PCT Pub. No.: WO2017/194595
PCT Pub. Date: Nov. 16, 2017

(65) Prior Publication Data
US 2019/0186768 A1    Jun. 20, 2019

(30) Foreign Application Priority Data

May 10, 2016  (SE) ...................... 1650630

(51) Int. Cl.
*F24F 3/16*    (2006.01)
*F24F 11/00*   (2018.01)
(Continued)

(52) U.S. Cl.
CPC .......... *F24F 11/30* (2018.01); *B01D 53/0454* (2013.01); *F24F 3/16* (2013.01);
(Continued)

(58) Field of Classification Search
CPC .. F24F 3/16; F24F 3/1603; F24F 11/30; F24F 11/72; F24F 11/89; F24F 2003/1625;
(Continued)

(56) References Cited

U.S. PATENT DOCUMENTS 5,564,626 A * 10/1996 Kettler .................... F24F 3/044
                                                                    236/49.3
2002/0193064 A1    12/2002 Michalakos et al.
(Continued)

FOREIGN PATENT DOCUMENTS

CN    1396839 A    2/2003
CN    102052713 A    5/2011
(Continued)

*Primary Examiner* — Frank M Lawrence, Jr.
(74) *Attorney, Agent, or Firm* — Condo Roccia Koptiw LLP

(57) ABSTRACT

The present specification relates to a system for managing the condition of air in an enclosed environment comprising a flow path adapted to circulate a flow of air through the enclosed environment, the flow of air comprising at least one of a first portion comprising a gas comprising oxygen and a second portion comprising indoor air from the enclosed environment. The flow path selectively provides the portions. An air processing assembly is adapted to receive the flow of air. A first and a second air processing element is provided. A control system is adapted to determine the first portion of gas comprising oxygen and the second portion of indoor air from the enclosed environment and control the selectively coupling of the air processing elements to the flow path.

20 Claims, 2 Drawing Sheets

(51) Int. Cl.
*F24F 11/30* (2018.01)
*F24F 11/89* (2018.01)
*F24F 11/72* (2018.01)
*B01D 53/04* (2006.01)
*F24F 110/70* (2018.01)
*F24F 140/60* (2018.01)
*F24F 110/50* (2018.01)

(52) U.S. Cl.
CPC ............ *F24F 3/1603* (2013.01); *F24F 11/72* (2018.01); *F24F 11/89* (2018.01); *F24F 2003/1625* (2013.01); *F24F 2003/1628* (2013.01); *F24F 2110/50* (2018.01); *F24F 2110/70* (2018.01); *F24F 2140/60* (2018.01)

(58) Field of Classification Search
CPC ........... F24F 2003/1628; F24F 2110/50; F24F 2110/70; F24F 2140/60; B01D 53/04; B01D 53/0454; B01D 2257/504
USPC ...................... 95/11, 139; 96/109, 111, 121
See application file for complete search history.

(56) References Cited

U.S. PATENT DOCUMENTS

| | | |
|---|---|---|
| 2005/0053515 A1 | 3/2005 | Yates et al. |
| 2007/0101688 A1* | 5/2007 | Wootton ............ B01D 46/0036 55/385.2 |
| 2011/0265648 A1 | 11/2011 | Meirav |
| 2011/0277490 A1 | 11/2011 | Meirav |
| 2012/0168119 A1* | 7/2012 | Dunnavant ........... F24F 12/006 165/59 |
| 2019/0100318 A1* | 4/2019 | Space ................ B01D 53/8696 |

FOREIGN PATENT DOCUMENTS

| | | |
|---|---|---|
| CN | 205048551 U | 2/2016 |
| JP | 5048454 B2 | 7/2012 |
| WO | WO 02/12796 A2 | 2/2002 |

\* cited by examiner

AIR TREATMENT SYSTEM FOR MANAGING THE CONDITION OF AIR IN AN ENCLOSED ENVIRONMENT

CROSS REFERENCE TO RELATED APPLICATIONS

This application is the National Stage Entry under 35 U.S.C. § 371 of Patent Cooperation Treaty Application No. PCT/EP2017/061161, filed 10 May 2017, which claims priority from Sweden Application No. 1650630-5, filed 10 May 2016, the contents of which are hereby incorporated by reference herein.

TECHNICAL FIELD

The present specification generally relates to the field of air treatment systems and in particularly discloses an air treatment system for managing air quality in an enclosed environment. The present specification also relates to method for managing air quality in an enclosed environment and a closed system for revitalization of air.

TECHNICAL BACKGROUND

According to some resent estimations, 1 in 8 deaths are linked with air pollution. Air pollutions are present both outside and indoors and since people today tend to spend a large amount of their time indoors, controlling the indoor environment is therefore of great importance.

The field of indoor climate and indoor air quality has numerous aspects which may be divided into aspects relating to comfort and aspects relating to health issues. In the context of this application, comfort climate refers to aspects of climate such as temperature, humidity and odour control. Aspects of health climate on the other hand are closely related to air pollution control. Examples of air pollutions include particulate matter, benzene, nitrogen dioxide, sulphur dioxide, carbon monoxide, carbon dioxide, benzo(a) pyrene, radon, volatile organic compounds (VOC) and ozone.

In an indoor environment, air pollution origins for example, from humans, furniture and cooking. To control the indoor air pollution levels, the indoor air is therefore commonly let outside and ambient, or outside, air is let inside. Outdoor air may however be for example too hot, cool, humid or polluted. Therefore, to achieve a comfortable and healthy climate, the outside air led inside may have to be cooled or heated depending on the temperature, humidity may have to be added or removed depending on the water content and outdoor air pollutions may have to be removed.

To control the temperature and to remove water from the outdoor air, heat pumps, or any other cooling machine, can be used. For example, the outdoor air may be cooled to the desired dew point and then heated, in order to obtain a desired temperature and humidity level. However, for this to work the whole year around at a location having varying seasons, the size of the cooling machine must unfortunately be chosen based on the demands on the expected hottest and most humid day.

Furthermore, as mentioned above, if the outside air is to dry, a humidifier must be used to control the humidity and if the outside air is polluted, air purifiers must be used to control the air pollution inside. State of the art air purifiers commonly comprise ionizers, HEPA filters, activated carbon beds, ultra violet light, thermal oxidation and catalytic oxidation. However, all these systems add to the energy requirements and the investment bill.

Accordingly, controlling the indoor climate is energy intense, at least in part due to the fact that the expected hottest, coolest and most polluted day of the year sets the size for the constituents in the system. Hence both investment- and operating costs for climate control devices tend to be high.

In order to alleviate some of these drawbacks, solutions have been proposed to reduce the energy requirements and the size of the system. For example, heat exchangers can be used to transfer energy between the indoor and the outdoor air when ventilating. This reduces the need for heating and cooling. Also, measuring the indoor carbon dioxide and air pollution levels can reduce the ventilation need. If the flow is reduced, the energy needed for temperature, humidity and air pollution control can also be reduced.

One further example of a proposed solution is systems purifying and circulating indoor air, such system may be referred to as heating, ventilation and air-conditioning systems (HVAC). However, the process of purifying the indoor air is also known to require large amounts of energy. Further, in order to provide a desired air quality and/or climate, some of the air has to be exhausted and replaced by outdoor which may still have to be treated in accordance with what is described above, also adding to the energy requirements. Therefore these systems are still associated with high energy requirements and costs.

SUMMARY OF THE INVENTION

Accordingly, it would be desirable to provide an improved control of the indoor climate and air quality. In particular, it would be desirable to provide a more energy efficient way of managing indoor climate. To better address one or more of these concerns a system and a method for managing a condition of air in an enclosed environment as defined in the independent claim are provided. Preferred embodiments are defined in the dependent claims.

According to a first aspect of the invention, an air treatment system for managing a condition of air in an enclosed environment is provided. The system comprises a supply of a gas comprising oxygen, a discharge for a flow of indoor air from the enclosed environment, a flow path adapted to circulate a flow of air through the enclosed environment, the flow of air comprising at least one of a first portion comprising gas comprising oxygen and a second portion comprising indoor air from the enclosed environment, the flow path further comprising means for selectively providing the first portion comprising gas comprising oxygen and the second portion comprising indoor air from the enclosed environment, an air processing assembly adapted to receive the flow of air, the assembly comprising a first air processing element adapted to remove a first pollutant from the flow of air; a second air processing element adapted to remove a second pollutant from the flow of air and means for selectively coupling the first and second processing elements to the first flow path, a first sensor adapted to sense a first parameter indicative of a condition of the indoor air, a second sensor adapted to sense a second parameter indicative of a condition of the gas comprising oxygen and a control system adapted to control the air treatment system. The control system is adapted to receive a desired value of a parameter indicative of a condition of the air flow, receive the first and second parameters from the first and second sensor; and based on the received parameters, determine the first portion of gas comprising oxygen and the second portion of indoor air from the enclosed environment by means of the means for selectively providing the first portion comprising gas comprising oxygen and the second portion comprising indoor air from the enclosed environment, and control the means for selectively coupling the first and second air processing elements to the flow path.

According to the first aspect, the system provides an inventive solution to the concerns described above by means of at least the functionality of the control system providing a combined control of the constitution of the flow of air in terms of the proportions of indoor air and gas comprising oxygen, for example by means of determining the amount, or portion, of indoor air to re-circulate and the amount of gas comprising oxygen to introduce into the system, and the selective provision of the provided air processing elements to the flow of air comprising the indoor air and gas comprising oxygen. This control is provided based at least in part on sensor values indicative of a condition such as the condition, i.e. quality of and/or climate present in, the indoor air and a condition of the gas comprising oxygen respectively, as compared to a desired condition of the air flow.

The desired condition of the air flow may in some embodiments be a desired condition of the air flow prior to entering the enclosed environment. In some embodiments, the desired condition of the air flow is a desired condition of the air flow downstream of the air processing assembly. In some embodiments, the desired condition is a desired condition of the air present in the enclosed environment.

Such a desired quality, or condition, may be indicated by a desired level of a suitable parameter, where examples include a desired $CO_2$ level, a desired temperature and/or a desired particle pollutant concentration or the like. The desired condition may in some embodiments also be referred to as a desired indoor climate; such a desired climate may for example be described by means of a plurality of parameter values indicative of different desired conditions of the air flow and/or a specific desired combination of parameters.

By means of the inventive combination of controllable functionalities of the system, this control may further be provided in a manner balanced, or in some embodiments, even optimized, in order to reach the desired condition, i.e. a desired indoor air quality and/or indoor climate, in a manner requiring for examples as little energy as possible or in other embodiments as fast as possible or in other embodiments in a manner adapted to meet any other objective suitable for the application in question. In other words, a desired specified indoor climate may be conveniently achieved while meeting suitable objections for the system in question.

Accordingly, the control provided may determine a mode, or state, of operation of the system suitable to meet different needs or objectives with regard to for example energy requirements, cost efficiency or maintenance intervals of the systems. This objective may differ depending on the application and/or environment in which the air treatment system is utilized. For example, in some embodiments, energy requirement may be required to be held as low as possible at all times whereas other embodiments may include systems where other aspects of the system operation such as for example maintenance requirements should be kept as low as possible.

Further, the system according to the first aspect may provide a possibility to continuously adapt the operation of the system depending on the current operating conditions, e.g. the quality the indoor air and the gas comprising oxygen, and accordingly increases the possibility of taking the effect of for example variable operating conditions into account when managing air condition and air quality in an enclosed environment.

Accordingly, advantages of the invention include for example that energy requirements of the air treatment system may be significantly reduced and further that the air quality provided may be increased due to the continuous control provided of the state of the circulated indoor air, the state of the gas comprising oxygen and the operation of various air processing elements provided in the system.

The air treatment system described above is suitable for managing the condition, or quality, of air in an enclosed environment. By enclosed environment may in some embodiments be understood an environment such as a room or similar space in a building. Other examples of enclosed environment include compartment of vehicles. The supply of gas comprising oxygen may be for example an inlet connected to the path of the system according to the first aspects. Examples include a duct or pipe providing a fluid connection between a source, or supply of gas comprising oxygen and the system and/or the flow path. Similarly, the discharge for a flow of air may be for example an air outlet arranged to allow a fluid flow to leave the enclosed environment. Examples include a duct or pipe providing a fluid connection between the enclosed environment and the outdoor space and/or another remote or separate space adapted to receive a flow on indoor air.

The flow path is adapted to circulate a flow of air through said enclosed environment and may comprise, and/or be adapted to flow in, a duct or a pipe. Such a duct, or flow duct, may comprise a first end adapted to allow a flow of air to enter the enclosed environment and a second end adapted to allow a flow of air to leave the enclosed environment. Accordingly, in some embodiments, a flow may be allowed to circulate though said duct, passing said first end, through said enclosed environment and passing said second end back into said duct.

In some embodiments, at least one of the supply of gas comprising oxygen and the discharge for indoor air is/are fluidly connected to the duct, or pipe, between the first end and the second end of the pipe.

In one embodiment, the supply of gas comprising oxygen is fluidly connected to the means for selectively providing said first portion comprising gas comprising oxygen and said second portion comprising indoor air from said enclosed environment.

In one embodiment, the air treatment system further comprises means for inducing, or creating, said flow or air and/or said circulation of air. Such means include for example fans or pumps of which many types are available, since these types of components are well known in the art they will however not be described in further detail.

The first sensor is adapted to sense a first parameter indicative of a condition of said indoor air. In some embodiments the first sensor is arranged in the enclosed environment. In other embodiments the first sensor is arranged to sense, or measure, said parameter in a flow of air from said enclosed, or indoor, environment. In one embodiment, the first sensor is arranged at the second end of the duct mentioned above adapted to allow a flow of air to leave the enclosed environment.

The second sensor is adapted to sense, or measure, a second parameter indicative of a condition of said gas comprising oxygen. In some embodiments the second sensor is arranged in or at the supply of gas comprising oxygen.

In one embodiment, the first and/or the second sensor is/are arranged at the means for selectively providing the first portion comprising gas comprising oxygen and the second portion comprising indoor air from the enclosed environment.

By parameter indicative of a condition of the air and/or gas should be understood any type of parameter related to the quality and/or climate of the indoor air and/or the gas comprising oxygen including parameters such as temperature, humidity and odour levels related to what has previously been defined as comfort aspects of the air or climate as well as parameters related to air pollution (i.e. health aspects) such as parameters related to oxygen content as well as to pollutant content such as particulate matter, benzene, nitrogen dioxide, sulphur dioxide, carbon monoxide, carbon dioxide, benzo(a)pyrene, radon, volatile organic compounds (VOC) and ozone.

Various types of sensors adapted to measure different kinds of air or gas quality parameters are as such generally known in the art and will not be described in detail. Examples however include any kind of sensor adapted to measure pollutants such as a particle sensor, a gas sensor adapted to measure for example VOC concentrations, a sensor adapted to measure $CO_2$-levels, oxygen levels and/or a sensor adapted to measures CO-levels. The skilled person realizes that embodiments comprising further sensors are conceivable within the scope of the present invention. For example, according to one embodiment, a further sensor is arranged to measure the air quality, i.e. to sense or measure a condition, of the air flow downstream of the air processing assembly possibly in some embodiments before, or just before, the air flow enters the enclosed environment.

The control system is further adapted to receive a desired value of a parameter indicative of a condition of the air flow. Such a desired value may for example be a value entered by a user and/or a value preset upon delivery and/or installation of the system.

Based on the values of the parameters indicative of a condition of the indoor air and the gas comprising oxygen values, i.e. the actual values representing a condition of the indoor air the gas comprising oxygen and the value representing the desired condition of the air flow, the control system determines the respective portion of indoor air and gas comprising oxygen, i.e. in a sense the mixing proportions for the air flow, as well as how the flow of air is to be treated by means of the air processing elements, or air treating elements, in order to achieve the desired condition of the air flow.

This is achieved by means of the control system exercising control over said means for selectively providing said first portion comprising gas comprising oxygen and said second portion comprising indoor air from said enclosed environment, and over said means for selectively coupling said first and second air processing elements to said flow path respectively.

Accordingly, the control system may for example control the means for selectively providing said first and second portion to provide only the first portion of gas comprising oxygen to said air flow, i.e. corresponding to a state of operation having no recirculation of indoor air, to provide only the second portion of indoor air to the flow of air, i.e. corresponding to at state of complete recirculation of indoor air or any combination, or mixing proportion, desired there between.

According to one embodiment, the control system is adapted to determine the first portion of gas comprising oxygen air and the second portion of indoor air from the enclosed environment by means of the means for selectively providing the first portion comprising gas comprising oxygen and the second portion comprising indoor air from the enclosed environment and control the means for selectively coupling the first and second air processing elements to the flow path by means of performing a calculation having the objective of minimizing the energy consumption of the system needed to reach the desired condition for the air flow, for example the air flow into the enclosed environment. In other words, the energy required to reach a desired specified condition in the enclosed environment, i.e. a desired indoor climate, may be minimized.

In one embodiment, the calculation is a non-linear optimization problem having the objective of minimizing the energy consumption of the system. Formulating such a problem may include formulating the energy requirements for performing any available operations in order to treat, process or condition the present indoor air or gas comprising oxygen in order to arrive at a desired condition of the air flow and expressing the total energy requirement as a function of these variables. Accordingly, the objective for the control system may in some embodiments be described as to control the air- and gas flows, such that the energy needed to achieve the desired air condition, or quality and/or climate, is minimized.

According to one embodiment, the means for selectively coupling the first and second processing elements to the first flow path comprises a first valve element adapted to direct the flow of air through the first air processing element and a second valve element adapted to direct the flow of air through the second air processing element. The first and second valve elements, respectively, may be arranged in at least a first position wherein the flow is directed through the respective air processing element and a second position wherein the flow of air is allowed to bypass the respective air processing element. Accordingly, the air flow may for example be direct to pass through only one of the air processing element, directed to pass through all elements and/or any desired number or combination of air processing elements. The air flow may further be directed to bypass all air processing elements. In some embodiments, at least one of the valve elements may be variable, continuously or stepwise, between the first position wherein the flow is directed through the respective air processing element and a second position wherein the flow of air is allowed to bypass the respective air processing element. Suitable duct, pipes or the like may be provided in order to allow for the flow to bypass or pass through the respective air treating element.

In some embodiments, the air processing elements may be referred to as air cleaning elements.

According to one embodiment, the means for selectively providing the first portion comprising a gas comprising oxygen and the second portion comprising indoor air from the enclosed environment comprises a first portion adapted to for receive a flow of gas comprising oxygen air, a second portion adapted to receive a flow of indoor air, a first valve arrangement adapted to adjust the flow of gas comprising oxygen and a second valve arrangement adapted to adjust the flow of indoor air. Accordingly, depending on the operation of the first and second valve arrangements, the mixing proportions of the air flow is determined.

According to one embodiment, at least one of said first and second air processing elements is an air processing element adapted to remove $CO_2$ from said flow of air. In some embodiments, such air processing elements include adsorption media for carbon dioxide, example of such media include molecular sieve 4A, 5A and 13X. The carbon dioxide adsorption bed may further comprise a narrow pore distribution, preferably around the size of the carbon dioxide molecule, i.e. 2.8 Å.

According to one embodiment, at least one of the one of the first and second air processing elements is an air processing element adapted to remove trace contaminants from the flow of air trace. In some embodiments, such an element comprises a trace contaminant adsorption bed adapted to remove trace contaminants by means of adsorption. Examples of trace contaminant adsorption media are activated carbon and activated carbon impregnated with phosphor acid. The trace contaminant adsorption bed preferably has a wide pore distribution, for example, but not restricted to, between 2 Å and 50 Å, or 2 Å and 30 Å, or 2 Å and 70 Å, or 4 Å and 70 Å.

According to one embodiment, at least one of the first and second air processing elements is a filter chosen from a group comprising filters adapted to remove particulate matter and filters adapted to remove gaseous pollutants from the flow of air. In some embodiments, such air treating elements may comprise a plurality filters adapted to remove one or more types of pollutants.

According to one embodiment, at least one of the first and second air processing elements is a catalytic oxidizer. The catalytic oxidizer may be adapted to remove carbon monoxide, methane and/or hydrogen. In one embodiment, the catalytic oxidizer comprises a catalyst, in which the temperature is, for example, but not restricted to, hotter than 400° C. or hotter than 500° C. or hotter than 600° C. In some embodiments however, a so called low temperature catalyst may be utilized in which the temperature may be for example approximately 100° C. The catalyst may preferably comprise a noble metal surface, for example a palladium surface.

According to one embodiment, at least one of the one of the first and second air processing elements is an air processing element adapted to remove acidic oxidization products from the flow of air. Such an air processing element may be arranged downstream of the catalytic oxidizer. One example of such an air processing element is a lithium-hydroxidebed.

According to one embodiment, the air processing assembly further comprises a third air processing element adapted to remove a third pollutant from the flow of air, wherein the first air processing element is an air processing element adapted to remove $CO_2$ by means of adsorption, the second air processing element is a filter and the third air processing element is an air processing element comprising active carbon.

According to one embodiment, the first air treatment device, the second air treatment device and the third air treatment device are arranged sequentially in a direction of flow in the flow path.

According to one embodiment, the air processing assembly is a scrubber. Such a scrubber may comprise a plurality of air treating elements such as adsorption beads for adsorption of CO2 and trace contaminants, a catalytic oxidizer for removing CO and/or various filters.

According to one embodiment, the supply of gas comprising oxygen is a supply of outdoor air. In other words, the gas comprising oxygen may be outdoor air. Such an embodiment may for example be economically advantageous in that the oxygen present in the outdoor air may be utilized to increase oxygen levels in the air flow.

According to one embodiment, the supply of gas comprising oxygen is a supply of oxygen from a closed container. Examples of such a container include a gas tank or other pressure vessels. Such an embodiment may for example be advantageous in that a system at least partly independent of the surrounding environment, for example the surrounding outdoor air, may be provided.

According to a second aspect of the present invention, a closed air revitalization system for managing a condition of air in an enclosed environment is provided. The system comprises an oxygen supply, a flow path adapted to circulate a flow of air through said enclosed environment, said flow of air comprising at least one of a first portion comprising oxygen from said oxygen supply and a second portion comprising indoor air from said enclosed environment, said flow path further comprising means for selectively providing said first portion comprising oxygen and said second portion comprising indoor air from said enclosed environment, air processing means adapted to receive said flow of air, said means comprising at least a first air processing element adapted to remove a first pollutant from said flow of air, a second air processing element adapted to remove a second pollutant from said flow of air and means for selectively coupling said first and second processing elements to said first flow path, a first sensor adapted to sense a first actual value of at least one air quality parameter of said indoor air and a control system adapted to control said air treatment system. Wherein said control is adapted to receive a desired value of said least one air quality parameter, receive said first actual values of said least one air quality parameter from said first and second sensor and, based on the received values, determine said first portion of oxygen and said second portion of indoor air from said enclosed environment by means of said means for selectively providing said first portion comprising oxygen and said second portion comprising indoor air from said enclosed environment, and control said means for selectively coupling said first and second air processing elements to said flow path.

Accordingly, apart from the advantageous described in the foregoing with reference to the first aspect of the invention, the second aspect of the invention provide additional advantages in that a closed system requiring little or no addition of outside air may be achieved. Accordingly, the system may operate independently from the surrounding outdoor environment.

Further objectives, advantages and features of the method conceivable within the scope of the second aspect of the invention are readily understood by the foregoing discussion referring to the first aspect of the invention. More particularly, in addition to the general applicability of the principles for control of the system described in the foregoing to the system according to the second aspect, the skilled person realizes that the features of the system of the described embodiment with regards to for example the design of fans or pumps, valve elements, ducts, sensor and the like may just as easily be applied to the system according to the second aspect of the invention.

According to a third aspect of the present invention, a method for managing a condition of air in an enclosed environment is provided. The method comprises the steps of circulating a flow of air through the enclosed environment, the flow of air comprising at least one of a first portion comprising a gas comprising oxygen and a second portion comprising indoor air from the enclosed environment; providing an air processing assembly adapted to receive the flow of air, the means comprising at least a first air processing element adapted to remove a first pollutant from the flow of air; and a second air processing element adapted to remove a second pollutant from the flow of air; receiving a desired value for a parameter indicative of parameter condition of said flow of air; receiving a first parameter indicative of a condition of the indoor air; receiving a second parameter indicative of a condition of the gas comprising oxygen; and based on the received values, determining the first portion of gas comprising oxygen and the second portion of indoor air from the enclosed environment; and selectively coupling the first and second air processing elements to the flow path.

Further objectives, advantages and features of the method conceivable within the scope of the third aspect of the invention are readily understood by the foregoing discussion referring to the first and second aspects of the invention.

Further objectives of, features of and advantages of the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The invention will be better understood through the following illustrative and non-limiting detailed description of preferred embodiments, with reference to the appended drawings, in which.

All figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
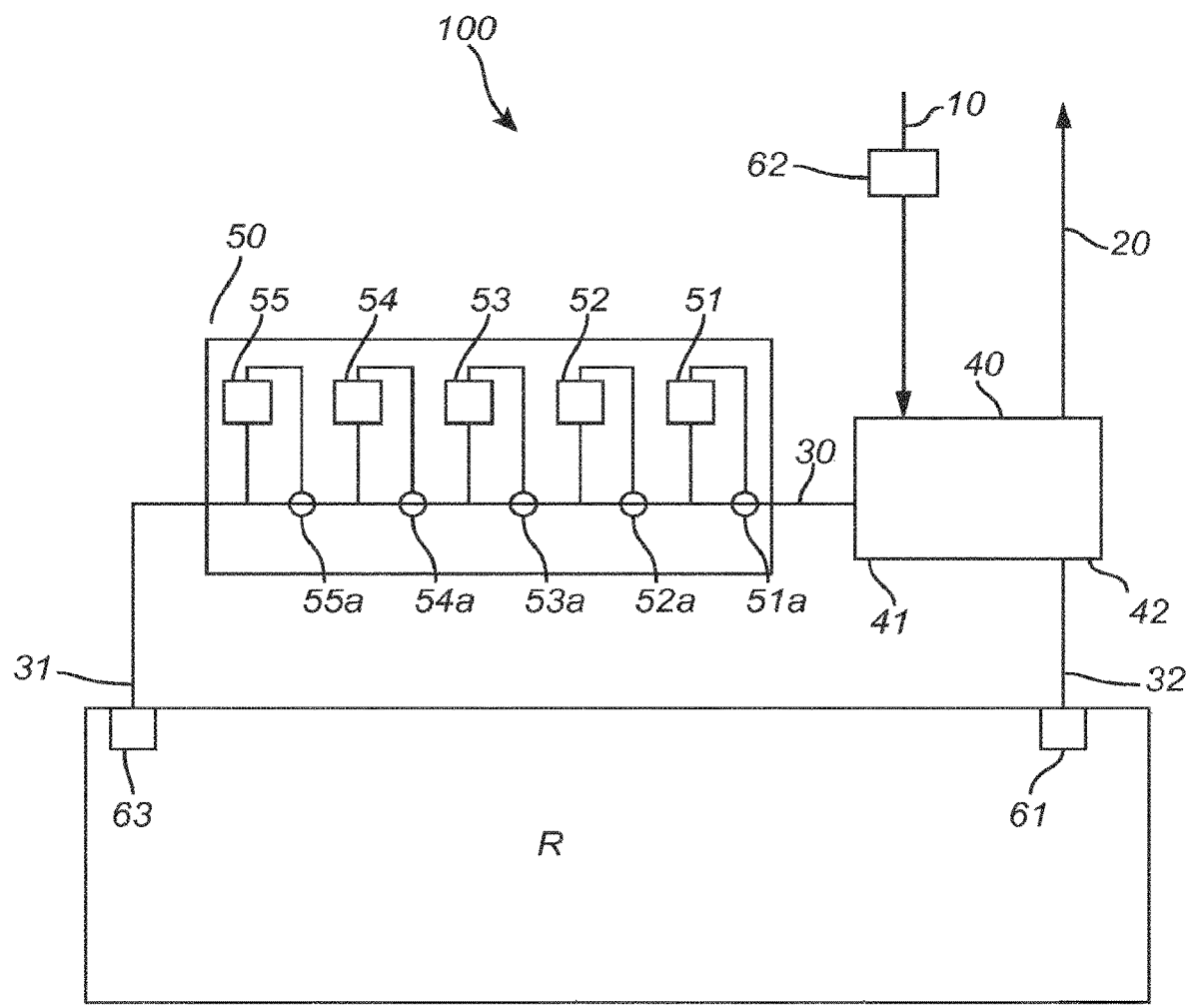
FIG. 1 is a schematic illustration of a system according to an embodiment of the first aspect of the invention.

FIG. 1 is a schematic illustration of a system 1 for managing a condition of air, also referred to as air quality and/or indoor climate, in an enclosed environment R, in the illustrated case a room R in a building, according to an aspect of the present invention. The system comprises a supply of outdoor air 10 a discharge 20 for a flow indoor air from said enclosed environment R and a flow path 30 adapted to circulate a flow of air AF through the enclosed environment R.

The flow path 30 comprise a first end 31 adapted to allow the flow of air to enter the room R and a second end 32 adapted to allow a flow of air to exit the room R.

The air flow AF comprises at least a first portion P1 of outdoor air and a second portion P2 comprising indoor air. Means 40 arranged in, or comprise by the flow path, are arranged to provide the first and second portion P1, P2. These means may in the illustrated case be described as a flow control arrangement comprising a first portion 41 adapted to receive a flow of outdoor air and a second portion 42 adapted to receive a flow of indoor air from the room R, a first valve arrangement (not shown) is arranged to adjust the flow of outdoor air and hence the first portion P1 of the air flow AF whereas a second valve arrangement is arranged to adjust the flow of indoor air and hence the second portion P2 of the air flow.

The system further comprises an air processing assembly 50 arranged in, or comprised by, the airflow path 30. In the illustrated embodiment in FIG. 1 the air processing assembly 50 comprises five air processing elements 51, 52, 53, 54, 55 adapted to remove pollutants. The first air processing element 51 comprises an air filter, the second air processing element 52 comprises a trace contaminant adsorption bed TCAB, the third air processing element 53 comprises a carbon dioxide adsorption bed CDAB, the fourth air processing element 54 comprises a catalytic oxidizer CO and the fifth air processing element 55 comprises a bed for adsorption of acidic oxidization products.

Means 51a, 52a, 53a, 54a, 55a in the forms of valve elements are arranged for selectively coupling the respective air processing element to the flow path. Each valve element 51a, 52a, 53a, 54a, 55a respectively, may be arranged in at least a first position wherein the air flow is directed through the respective air processing element 51, 52, 53, 54, 55 and a second position wherein the flow of air is allowed to bypass the respective air processing element. Accordingly, the air flow may for example be direct to pass through only one of the air treatment element, directed to pass through all elements and/or any desired number or combination of air treating elements. The air flow may further be directed to bypass all air treating elements.

The TCAB and the CDAB of the first and second air processing elements 51, 52 comprises (not shown) a thermal insulated housing, a vacuum pump, sealable valves, a heater, an adsorption media for trace contaminants, an adsorption media for carbon dioxide and a pressure valve confined in the housing. When the sealable valves are open, air is lead through the thermal insulated hosing and through the trace contaminant and the carbon dioxide adsorption media respectively and trace contaminants and carbon dioxide are adsorbed in the beds.

The trace contaminant adsorption bed should have a wide pore distribution, for example, but not restricted to, between 2 Å and 50 Å, or 2 Å and 30 Å, or 2 Å and 70 Å, or 4 Å and 70 Å. Examples of trace contaminant adsorption media are activated carbon and activated carbon impregnated with phosphor acid. The carbon dioxide adsorption bed should be a narrow pore distribution around the size for the carbon dioxide molecule, e.g. 2.8 Å. Example of adsorption media are molecular sieve 4A, 5A and 13X.

When air is led though the beds, trace contaminants and carbon dioxide are adsorbed in the pores. After a while, depending in the flow and the pollutions and the pollutions level, the beds becomes saturated and the adsorption of carbon dioxide in the CDAB stops or the rate of adsorption reduced, and the adsorption in the TCAB of certain contaminants stops or the adsorption rate reduces and the beds needs to be regenerated. To regenerate the beds, first the sealable valves seal the thermally insulated housing. Then, the heater, heats the air and the adsorption media confined in the respective thermally insulated housing to, for example, but not restricted to 40 Celsius, or 70 Celsius, or 90 Celsius, or 110 Celsius or 150 Celsius or 200 Celsius, or 300 Celsius. When the bed has reached the desired temperature, the vacuum pump starts operating and evacuates the gas and trace contaminants confined in the container to the outside air. The pressure in the thermal insulated housing needed for the regeneration are less than 50 000 Pascal, or 10 000 Pascal, or 5000 Pascal.

When, the beds have been regenerated, a pressure valve is opened to allow air to flow into the housings. The pressure will increase and the sealable valves can be opened. The adsorption beds and have been regenerated and polluted air can be led through the bed again.

Some trace contaminants, such as carbon monoxide, might break through the TCAB. Therefore an oxidization of these contaminants might be needed which is provided by the catalytic oxidizer CO of element 54. The CO comprises (not shown) a heat exchanger, a heater, a catalyst and a lithium hydroxide bed. Air is led through the CO using the valve for flow control 54a. First the air enters the heat exchanger where energy is exchanged with the air leaving the catalyst, i.e. the air becomes heated since heat energy is transferred to the air through the heat exchanger. Then, the air is heated further to the desired temperature using the heater. The air is then lead through the catalyst. In the catalyst, the temperature is, for example, but not restricted to, hotter than 400 degrees or hotter than 500 degrees or hotter than 600 degrees. The catalyst may have a noble metal surface, such as for example a palladium surface. The hot air is then lead back to the heat exchanger where it transfers heat energy to the air entering the heat exchanger.

One specific type of compound known to possibly break through the TCAB is so called halocarbon compounds. When such compounds are exposed to the high temperatures in the catalyst so called acidic oxidization products are produces. In order to handle these acidic oxidization products, a lithium-hydroxidebed is comprised by the fifth air processing element 55 arranged downstream of the catalytic oxidizer.

The illustrated exemplary system further comprises a plurality of sensors. A first sensor 61 is arranged to measure, or sense, a first parameter P1 indicative of a condition of the indoor air and a second sensor 62 is arranged to measure, or sense, a parameter P2 indicative of a condition of the outdoor air. A further sensor 63 is arranged to measure the condition of the air flow AF allowed to enter the room R. The sensors 61, 62, 63 may be sensors measuring temperature, oxygen levels, humidity and air pollutions. The air pollution sensors may for example be sensitive to particulate matter, benzene, nitrogen dioxide, sulphur dioxide, carbon monoxide, carbon dioxide, benzo(a)pyrene, radon, volatile organic compounds and ozone.

The operation of the system will now be described in greater detail with reference to FIG. 1. The operation of the system 100 is provided by means of a control system (not shown) comprising suitable circuitry and wiring to control at least the valves adapted to control the mixing proportions of the air flow and the valves adapted to control the air flow through the air processing elements 51, 52, 53, 54, 55.

A desired indoor climate may be specified by means of one or more parameters indicative of such a desired climate or condition. The control system is adapted to receive such a desired value of at least one parameter PD indicative of a condition of the air flow, for example indicative of the condition of the air flow downstream of the air processing assembly. This desired value may be received for example by means of user input. The control system is further adapted to receive the first and second actual values P1, P2 of the parameters from the first and second sensor 61, 62 and to, based on the received values, determine the first portion of outdoor air and the second portion of indoor air from the enclosed environment by means of controlling the valve elements for selectively providing the first portion comprising outdoor air and the second portion comprising indoor air from the enclosed environment, and control the valves 51a, 52a, 53a, 54a, 55a for selectively coupling the first and second air processing elements to the flow path.

Accordingly, based on the parameters indicative of the condition of respective air flows, i.e. the actual values of the parameters indicative of a condition of the in- and outdoor air and the value representing the desired air quality, i.e. the desired condition of the air flow, the control system determines the respective portion of in- and outdoor air, i.e. in a sense the mixing proportions of the air flow, as well as how the flow of air is to be treated by means of the air processing elements, or air treating elements, in order to achieve the desired quality, in the illustrated case as the air flow enters the room R.

In the embodiment illustrated in FIG. 1, the control system is adapted to determine the mixing proportions of the air flow, as well as how the flow of air is to be treated (or not treated) by means of the air processing elements, in order to achieve the desired quality or condition of the air flow (i.e. the specified desired indoor climate) by means of solving a non-linear optimization problem having the objective of minimizing the energy consumption of the system needed to reach the desired value of the parameter indicative of the condition of the air in the enclosed environment. Accordingly, the objective for the control system may be described as to control the airflows, such that the energy needed to reach the desired air quality, or climate, is minimized. For example, to minimize the energy required to provide air at the first end 31 of the flow path that fulfils the requirements from a user.

In order to be able to formulate such a problem may the energy requirements for performing the respective air processing operations provided by the air processing elements 51, 52, 53, 54, 55 in order to arrive at a desired air quality must be known to the system. For example, if the outdoor air entering the system from the supply of outdoor air is unpolluted but too hot and humid, the air must be dehumidified and cooled using a dehumidifier and a cooling machine (not shown), or a combination thereof. Assume the energy need for this is E1. If the indoor air allowed to exit the room air at 32 is polluted, but has the right temperature and humidity the air needs to be purified. Assume the energy need for this is E2. The objective for the control system may then be described as to control the values, and thus the airflows, such that the energy needed to reach the desired air quality, and/or climate is minimized. In order to find the energy E2 to purify the air, the control system needs to know how to remove pollutions using the air filter of element 51, the trace contaminant adsorption bed of element 52, the carbon dioxide adsorption bed of element 53 and the catalytic oxidizer of element 54 as well as how much pollution to remove and the energy requirements for removal of the respective type of pollution.

In the exemplary illustrated case, let E be the energy to purify, heat/cool and humidify/dehumidify the air, T be the temperature, RH the relative humidity and let Q1, Q2, . . . , Qn represent the airflows, in the illustrated case the first portion P1 of outdoor air of the air flow AF and the second portion P1of indoor air of the air flow AF. The climate control can now be formulated as a non-linear optimization problem;

minimize E(Q1,Q2, . . . ,Qn)

such that
Oxygen>min allowed level
min allowed level<Nitrogen<max allowed level
min allowed T<T<max allowed T
min allowed RH<RH<max allowed RH
Carbon dioxide<max allowed level
Carbon monoxide<max allowed level
VOC<max allowed VOC
PM2.5<max allowed PM2.5
PM10<max allowed PM10
Benzene<max allowed level
Nitrogen dioxide<max allowed level Benzo(a)pyrene<max allowed level
Radon<max allowed level
Ozon<max allowed level Solving this optimization problem will minimize the energy need in all climates and for all internal air pollutions.

Figure 2:
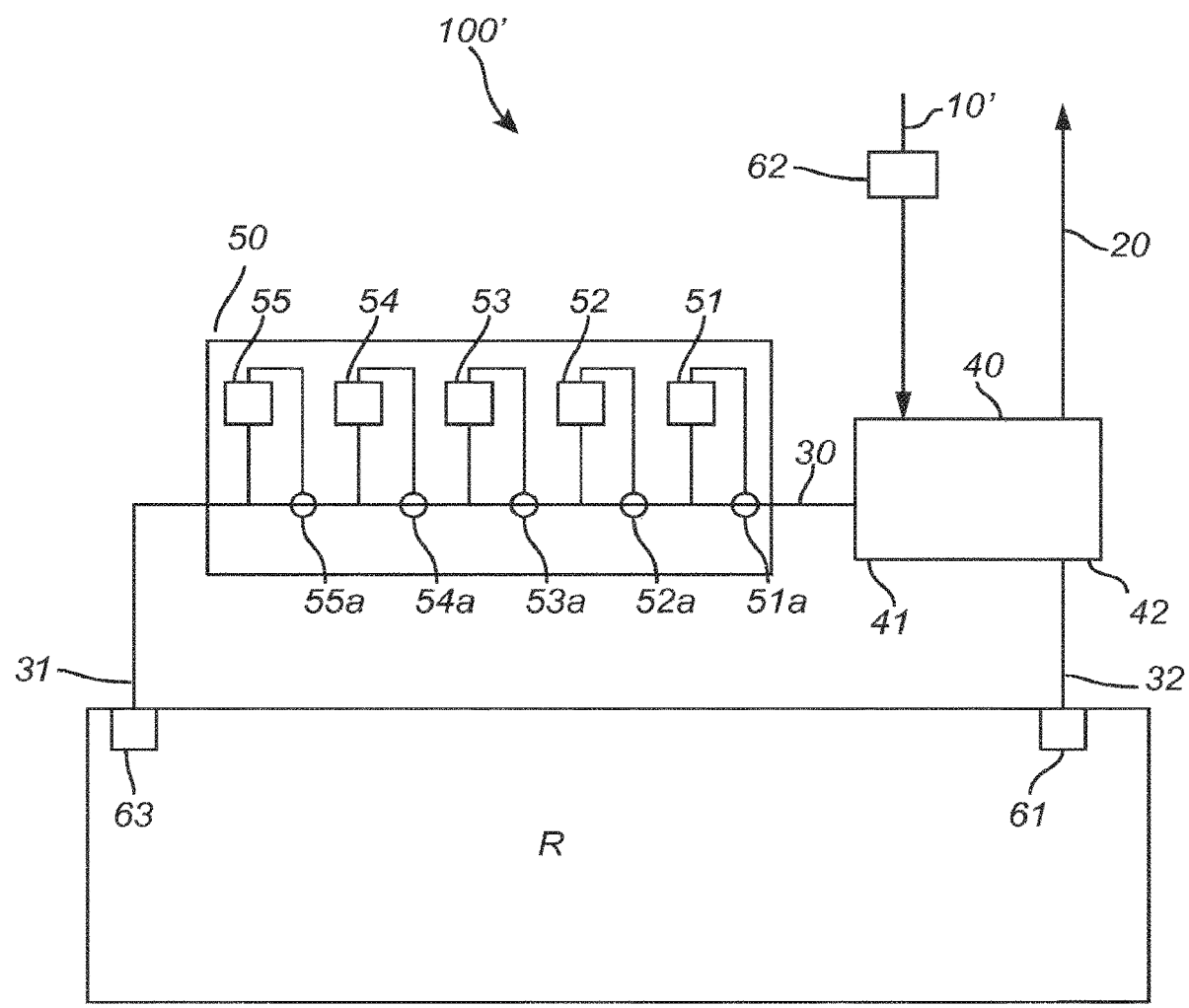
FIG. 2 is a schematic illustration of a system according to an embodiment of the second aspect of the invention.

Turning to FIG. 2, a closed air treatment, or revitalization system 100' for managing air quality in an enclosed environment R according to an aspect of the present invention is schematically illustrated. The system comprises a supply of oxygen 10', a discharge 20 for a flow indoor air from said enclosed environment R and a flow path 30 adapted to circulate a flow of air AF through the enclosed environment R. The flow path 30 comprise a first end 31 adapted to allow the flow of air to enter the room R and a second end 32 adapted to allow a flow of air to exit the room R.

The air flow AF in the aspect illustrated in FIG. 2 comprises at least a first portion P1 of oxygen, or gas having a high oxygen content, and a second portion P2 comprising indoor air. The oxygen, or gas comprising high oxygen content, may be provided by means of a gas tank, or container, fluidly connected to the system. Means 40 arranged in, or comprise by the flow path, are arranged to provide the first and second portion P1, P2 respectively. These means may in the illustrated case be described as a flow control arrangement comprising a first portion 41 adapted to receive a flow of oxygen and a second portion 42 adapted to receive a flow of indoor air from the room R, a first valve arrangement (not shown) is arranged to adjust the flow of oxygen and hence the first portion P1 of the air flow AF whereas a second valve arrangement is arranged to adjust the flow of indoor air and hence the second portion P2 of the air flow.

The system further comprises an air processing assembly 50 comprising air processing elements 51, 52, 53, 54, 55 adapted to remove pollutants. The structure and functionality of these features are the same as what has been described in the foregoing with reference to FIG. 1. Also similar to, or in accordance to, what has been described above, the system illustrated in FIG. 2 comprises a plurality of sensors. A first sensor 61 is arranged to measure, or sense, a first actual value QP1 of an air quality parameter of 1 the indoor air and a second sensor 62 is arranged to measure, or sense, a second value indicative of a condition of the gas comprising oxygen, for example the oxygen content.

The operation of the system 100' will now be described in greater detail with reference to FIG. 2. The operation of the system 100' is provided by means of a control system (not shown) operating in accordance with what has been described in the foregoing with the exception that instead of controlling a flow of outdoor air, the control system controls a flow of gas comprising oxygen from the oxygen supply.

The control system is adapted to receive a desired value of at least one air quality parameter QD, this desired value may be received for example by means of user input, receive the first actual values QP1 of the at least one air quality parameter from the first sensor 61 and a second value QP2 indicative of a condition of the gas comprising oxygen and is further adapted to, based on the received values, determine the first portion of gas comprising oxygen and the second portion of indoor air from the enclosed environment by means of controlling the valve elements for selectively providing the first portion comprising oxygen and the second portion comprising indoor air from the enclosed environment, and control the valves 51a, 52a, 53a, 54a, 55a for selectively coupling the first and second air processing elements to the flow path.

Accordingly, based on the parameters indicative of the condition of the air and gas, i.e. the quality parameter values or actual values of the air quality of the indoor air and the available gas comprising oxygen and the value representing the desired air quality, the control system of system 100' determines the respective portion of indoor air and oxygen (i.e. air comprising oxygen), as well as how the flow of air flow is to be treated by means of the air processing elements, or air treating elements, in order to achieve the desired quality. This control is once again provided by means of solving a non-linear optimization problem having the same objective of minimizing the energy consumption of the system needed to reach the desired value of the at least one air quality parameter in the enclosed environment as what has been described with reference to FIG. 1. The difference however being that the outdoor air is replaced by a supply of gas comprising oxygen. Accordingly, any additional energy requirements for performing potential gas processing operations on the gas comprising oxygen in order to achieve a desired climate and/or air quality must be known to the system.

While the invention has been illustrated and described in detail in the drawings and foregoing description, such illustration and description are to be considered illustrative or exemplary and not restrictive; the invention is not limited to the disclosed embodiments. The skilled person understands that many modifications, variations and alterations are conceivable within the scope as defined in the appended claims.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

EMBODIMENTS

1. An air treatment system for managing a condition of air in an enclosed environment, said system comprising
  a supply of a gas comprising oxygen;
  a discharge for a flow of indoor air from said enclosed environment;
  a flow path adapted to circulate a flow of air through said enclosed environment, said flow of air comprising at least one of a first portion comprising said gas comprising oxygen and a second portion comprising indoor air from said enclosed environment, said flow path further comprising
    means for selectively providing said first portion comprising said gas comprising oxygen and said second portion comprising indoor air from said enclosed environment;
    an air processing assembly adapted to receive said flow of air, said means comprising at least
      a first air processing element adapted to remove a first pollutant from said flow of air;
      a second air processing element adapted to remove a second pollutant from said flow of air; and
      means for selectively coupling said first and second processing elements to said first flow path;
  a first sensor adapted to sense a first parameter indicative of a condition of said indoor air, a second sensor adapted to sense a second parameter indicative of a condition of said gas comprising oxygen; and
a control system adapted to control said air treatment system; wherein said control system is adapted to
receive a value of a parameter indicative of a desired condition for said air flow;
receive said first and second actual parameters from said first and second sensor; and
based on the received parameters,
determine said first portion of gas comprising oxygen and said second portion of indoor air from said enclosed environment by means of said means for selectively providing said first portion comprising said gas comprising oxygen and said second portion comprising indoor air from said enclosed environment, and
control said means for selectively coupling said first and second air processing elements to said flow path.

2. Air treatment system according to embodiment 1, wherein said means for selectively coupling said first and second processing elements to said first flow path comprises
a first valve element adapted to direct said flow of air through said first air processing element; and
a second valve element adapted to direct said flow of air through said first air processing element,
wherein said first and second valve elements, respectively, may be arranged in at least a first position wherein said flow is directed through the respective air processing element and a second position wherein said flow of air is allowed to bypass the respective air processing element.

3. Air treatment system according to embodiment 1 or 2, wherein said means for selectively providing said first portion comprising said gas comprising oxygen and said second portion comprising indoor air from said enclosed environment comprises
a first portion adapted to for receive a flow of gas comprising oxygen;
a second portion adapted to receive a flow of indoor air;
a first valve arrangement adapted to adjust said flow of gas comprising oxygen; and
a second valve arrangement adapted to adjust said flow of indoor air.

4. Air treatment system according to any of the preceding embodiments, wherein at least one of said first and second air processing elements is an air processing element adapted to remove $CO_2$ from said flow of air.

5. Air treatment system according to any of the preceding embodiments, wherein at least one of said first and second air processing elements is a filter chosen from a group comprising filters adapted to remove particulate matter and filters adapted to remove gaseous pollutants from said flow of air.

6. Air treatment system according to any of the preceding embodiments, wherein at least one of said first and second air processing elements is an air processing element adapted to remove trace contaminants from said flow of air.

7. Air treatment system according to any of the preceding embodiments, wherein at least one of said first and second air processing elements is a catalytic oxidizer.

8. Air treatment system according to embodiment 1, wherein said air processing means assembly further comprises
a third air processing element adapted to remove a third pollutant from said flow of air;
wherein said first air processing element is an air processing element adapted to remove CO2 by means of adsorption, said second air processing element is a filter and said third air processing element is an air processing element comprising active carbon.

9. Air treatment system according to embodiment 8, wherein said first air treatment device, said second air treatment device and said third air treatment device are arranged sequentially in a direction of flow in said flow path.

10. Air treatment system according to any of the preceding embodiments, wherein said supply of a gas comprising o is a supply of outdoor air.

11. Air treatment system according to any of the preceding embodiments, wherein said control system is adapted to
determine said first portion of outdoor air and said second portion of indoor air from said enclosed environment by means of said means for selectively providing said first portion comprising outdoor air and said second portion comprising indoor air from said enclosed environment, and
control said means for selectively coupling said first and second air processing elements to said flow path
by means of performing a calculation having the objective of minimizing the energy consumption of the system needed to reach the desired value of said at least one air quality parameter in said enclosed environment.

12. Method for managing a condition of air in an enclosed environment, said method comprising the steps of:
circulating a flow of air through said enclosed environment, said flow of air comprising at least one of a first portion comprising a gas comprising oxygen and a second portion comprising indoor air from said enclosed environment;
providing an air processing assembly adapted to receive said flow of air, said means comprising at least
a first air processing element adapted to remove a first pollutant from said flow of air; and
a second air processing element adapted to remove a second pollutant from said flow of air;
receiving a value of a parameter indicative of a desired condition of said flow of air;
receiving a first parameter indicative of a condition of said indoor air;
receiving a second parameter indicative of a condition of said outdoor air;
and based on the received values,
determining said first portion of outdoor air and said second portion of indoor air from said enclosed environment; and
selectively coupling said first and second air processing elements to said flow path.

The invention claimed is:
1. An air treatment system for managing a condition of air in an enclosed environment, said system comprising:
a supply of a gas comprising oxygen;
a discharge for a flow of indoor air from said enclosed environment;
a flow path adapted to circulate a flow of air through said enclosed environment, said flow of air comprising at least one of a first portion comprising said gas comprising oxygen or a second portion comprising indoor air from said enclosed environment, said flow path further comprising:
a means for selectively providing said first portion comprising said gas comprising oxygen and said second portion comprising indoor air from said enclosed environment; and an air processing assembly adapted to receive said flow of air, said means comprising at least:
  a first air processing element adapted to remove a first pollutant from said flow of air;
  a second air processing element adapted to remove a second pollutant from said flow of air; and
  a means for selectively coupling said first and second processing elements to said first flow path, comprising:
    a first valve element adapted to direct said flow of air through said first air processing element; and
    a second valve element adapted to direct said flow of air through said second air processing element;
    wherein said first and second valve elements, respectively, are arranged in at least a first position wherein said flow is directed through the respective air processing element and a second position wherein said flow of air is allowed to bypass the respective air processing element;
  a first sensor adapted to sense a first parameter indicative of a condition of said indoor air;
  a second sensor adapted to sense a second parameter indicative of a condition of said gas comprising oxygen; and
  a control system adapted to control said air treatment system;
  wherein said control system is adapted to:
    receive a value of a parameter indicative of a desired condition for said air flow;
    receive said first and second parameters from said first and second sensor;
    based on the received parameters, determine said first portion comprising oxygen and said second portion of indoor air from said enclosed environment by means of said means for selectively providing said first portion comprising said gas comprising oxygen and said second portion comprising indoor air from said enclosed environment; and
    control said means for selectively coupling said first and second air processing elements to said flow path.

2. The air treatment system of claim 1, wherein said means for selectively providing said first portion comprising said gas comprising oxygen and said second portion comprising indoor air from said enclosed environment comprises:
  a first part adapted to receive a flow of gas comprising oxygen;
  a second part adapted to receive a flow of indoor air;
  a first valve arrangement adapted to adjust said flow of gas comprising oxygen; and
  a second valve arrangement adapted to adjust said flow of indoor air.

3. The air treatment system of claim 1, wherein at least one of said first air processing element or said second air processing element comprises an air processing element adapted to remove $CO_2$ from said flow of air.

4. The air treatment system of claim 1, wherein at least one of said first air processing element or said second air processing element comprises a filter chosen from a group comprising filters adapted to remove particulate matter and filters adapted to remove gaseous pollutants from said flow of air.

5. The air treatment system of claim 1, wherein at least one of said first air processing element or said second air processing element comprises an air processing element adapted to remove trace contaminants from said flow of air.

6. The air treatment system of claim 1, wherein at least one of said first air processing element or said second air processing element comprises a catalytic oxidizer.

7. The air treatment system of claim 1, wherein said air processing assembly further comprises:
  a third air processing element adapted to remove a third pollutant from said flow of air;
  wherein said first air processing element comprises an air processing element adapted to remove CO2 by means of adsorption, said second air processing element comprises a filter, and said third air processing element comprises an air processing element comprising active carbon.

8. The air treatment system of claim 7, wherein said first air processing element, said second air processing element and said third processing element are arranged sequentially in a direction of flow in said flow path.

9. The air treatment system of claim 1, wherein said supply of said gas comprising oxygen comprises a supply of outdoor air.

10. The air treatment system of claim 1, wherein said control system is further adapted to:
  determine said first portion comprising the gas comprising oxygen and said second portion of indoor air from said enclosed environment by means of said means for selectively providing said first portion comprising the gas comprising oxygen and said second portion comprising indoor air from said enclosed environment; and
  control said means for selectively coupling said first and second air processing elements to said flow path by means of performing a calculation having the objective of minimizing the energy consumption of the system needed to reach the desired condition of the air flow.

11. A method for managing a condition of air in an enclosed environment, the method comprising:
  circulating a flow of air through said enclosed environment via a flow path, said flow of air comprising at least one of a first portion comprising a gas comprising oxygen or a second portion comprising indoor air from said enclosed environment;
  providing an air processing assembly adapted to receive said flow of air, said air processing assembly comprising at least:
    a first air processing element adapted to remove a first pollutant from said flow of air; and
    a second air processing element adapted to remove a second pollutant from said flow of air;
  receiving a value of a parameter indicative of a desired condition of said flow of air;
  receiving a first parameter indicative of a condition of said indoor air;
  receiving a second parameter indicative of a condition of said outdoor air;
  based on the received values, determining said first portion of outdoor air and said second portion of indoor air from said enclosed environment; and
  selectively coupling said first and second air processing elements to said flow path.

12. The method of claim 11, wherein at least one of said first air processing element or said second air processing element comprises an air processing element adapted to remove $CO_2$ from said flow of air.

13. The method of claim 11, wherein at least one of said first air processing element or said second air processing element comprises a filter chosen from a group comprising filters adapted to remove particulate matter and filters adapted to remove gaseous pollutants from said flow of air.

14. The method of claim 11, wherein at least one of said first air processing element or said second air processing element comprises an air processing element adapted to remove trace contaminants from said flow of air.

15. The method of claim 11, wherein at least one of said first air processing element or said second air processing element comprises a catalytic oxidizer.

16. The method of claim 11, wherein said air processing assembly further comprises:
   a third air processing element adapted to remove a third pollutant from said flow of air;
   wherein said first air processing element comprises an air processing element adapted to remove CO2 by means of adsorption, said second air processing element comprises a filter, and said third air processing element comprises an air processing element comprising active carbon.

17. The method of claim 16, wherein said first air processing element, said second air processing element and said third processing element are arranged sequentially in a direction of flow in said flow path.

18. The method of claim 11, wherein said gas comprising oxygen comprises outdoor air.

19. An air treatment system for managing a condition of air in an enclosed environment, the system comprising:
   a supply of a gas, the gas comprising oxygen;
   a discharge for a flow of indoor air from the enclosed environment;
   a flow path configured to circulate a flow of air through the enclosed environment, wherein the flow of air comprises at least one of a first portion comprising the gas or a second portion comprising the indoor air;
   a first air processing element disposed in the flow path and configured to receive the flow of air and to remove a first pollutant from the flow of air;
   a second air processing element disposed in the flow path and configured to receive the flow of air and to remove a second pollutant from the flow of air;
   a first valve element coupled to the first air processing element, and configured to be arranged in at least a first position wherein the flow of air is directed through the first air processing element or a second position wherein the flow of air is allowed to bypass the first air processing element;
   a second valve element coupled to the second air processing element, and configured to be arranged in at least a first position wherein the flow of air is directed through the second air processing element or a second position wherein the flow of air is allowed to bypass the second air processing element;
   a first sensor configured to sense a first parameter indicative of a condition of the indoor air;
   a second sensor configured to sense a second parameter indicative of a condition of the gas; and
   a control circuitry configured to:
      receive a value of a third parameter indicative of a desired condition for the flow of air;
      receive the first parameter from the first sensor and the second parameter from the second sensor;
      based on the received parameters, determine the first portion and the second portion; and
      provide the first portion and the second portion to the first air processing element via the flow path.

20. The system of claim 19, wherein at least one of said first air processing element or said second air processing element comprises an air processing element adapted to remove $CO_2$ from said flow of air.

* * * * *